Fig. 10.

May 22, 1962 N. J. GEORGETTE ETAL 3,035,833
STRIP STOCK FEEDING MACHINE

Filed Dec. 26, 1956 6 Sheets-Sheet 6

INVENTORS
Nicholas J. Georgette and
BY William Hayden
Wooster & Davis
ATTORNEYS.

United States Patent Office 3,035,833
Patented May 22, 1962

3,035,833
STRIP STOCK FEEDING MACHINE
Nicholas J. Georgette, Stratford, and William Hayden, Bridgeport, Conn., assignors to Technical Design and Development Company, Incorporated, Devon, Conn., a corporation of Connecticut
Filed Dec. 26, 1956, Ser. No. 630,508
6 Claims. (Cl. 271—4)

This invention relates to a machine for feeding strip stock to power presses, and has for an object to provide an effective feeder which will automatically feed strip stock to the press and be accurately synchronized with the operation of the press.

It is also an object to provide such a feeder in which may be placed a stack of strips of the material to be fed, and the strips fed successively from this stack, thus permitting operation without the necessity of employing a continuous attendant, and sufficient stock may be placed in the machine for operation of the press for a considerable length of time without other attention.

It is another object of the invention to provide a feeder of this type in which strips of laminated plastic or fiber may be fed to the power press and in which the strips may be accurately heated to a proper temperature for the press operation to prevent cracking of the material, and which will uniformly maintain this temperature and proper heating of the material.

With the foregoing and other objects in view, we have devised the construction illustrated in the accompanying drawings forming a part of this specification. It is, however, to be understood the invention is not limited to the specific details of construction and arrangement shown, but may embody various changes and modifications within the scope of the invention.

The machine comprises a frame 10, including a pair of supporting legs 11 at each of the opposite ends thereof, which may be made of any suitable structure or material, but is preferably a welded sheet metal structure, as indicated, and it is provided with supporting feet 12 which are vertically adjustable for adjusting the height of the machine to permit proper alignment of the feeding means with the dies of the power or blanking press to which the material is being fed. A simple and effective adjusting means is to provide upright portions 13 of these feet having slots 14 and clamping screws 15 in these slots to secure the feet in different adjusting positions.

The machine comprises a pair of feed rolls 16 and 17 (FIG. 8) for feeding material to the blanking press 18 (FIG. 1), an endless flexible belt 19 for feeding the strips successively to the feed rolls from a stack of strips 20 (FIG. 6) of the material supported on the belt, and means for properly heating the material of these strips if desired, as where these strips are of plastic or fibrous material.

The feed rolls are mounted in a pair of suitable brackets 21 secured on the front of the machine by any suitable means, such, for example, as a mounting plate 21a by screws 22 (FIGS. 11 and 12) and which plate is secured to the end of the frame by suitable bolts (not shown) through openings 22a, and preferably flexibly so mounted through rubber pads 23 located between the mounting plate and the frame of the machine. At their outer ends these brackets are provided with ears or lugs 24 for rigidly attaching to the bolster or bed 25 of the press by any suitable means, such, for example, as bolts or screws through the openings 26 in these ears 24. The rolls 16 and 17 are mounted one above the other on suitable shafts 27 and 28 respectively. The shaft 27 of the lower roll 16 is mounted in stationary bearings 29 in the brackets 21, while shaft 28 of the upper roll 17 is mounted in bearings 30 in supporting arms 31 pivoted by the pivot studs 32 to the upright extensions 33 of each bracket, the brackets being tied together by the transverse bar 34 secured at its opposite ends 35 in these brackets. This bar can be eliminated due to construction of oven plate 96, which is fastened to the brackets 21 through lugs 100 and 100a. As the arms 31 carrying the upper roll are pivoted at 32, they permit up and down adjustment and movement of the upper roll.

Pivoted to the outer side of each bracket by means of a pivot stud 36 is an upright arm 37 carrying at its upper end a head or arm member 38 having a bearing for an upright slidable rod 39 (FIG. 13) bearing at its lower end, which is preferably rounded, as indicated at 40, in a recess 41 in the top of the extension 42 of the arm 31, and on this rod is a coil spring 43 bearing against an adjustable nut 44 on the rod and the head 38 to thus tend to force the rod 39 downwardly, and by pressure on the arm 31 to provide an upwardly yieldable support for the upper roll 17 which is biased toward the lower roll by the springs 43. Downward movement of the rod 39 is limited by the hand grip or knob 45, secured to the upper end of this rod, by its resting on the top of the head 38. There is one of these arms 37 with the parts carried thereby, including the spring biased rod 39, on each of the brackets 21, and therefore cooperating with the two arms 31 supporting the opposite ends of the roll 17. The arms 31 may be released by pulling up on the knobs 45 to remove their lower ends from the recesses 41. This will permit the arms 37 to be swung downwardly to the right as viewed in FIG. 11 about their pivots 36, and will permit the arms 31 to be swung upwardly and backwardly with the top roll 17 about pivots 32. Or if preferred, heads or arms 38 may be swung about pins 38a as pivots to move these arms out of the path of arms 31 for opening the rolls.

Figure 10:
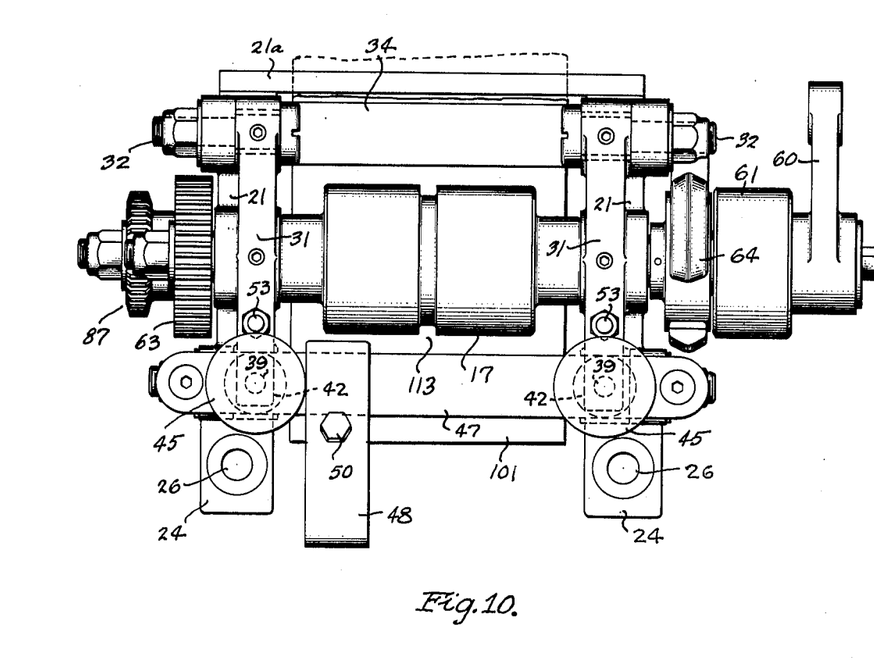
FIG. 10 is a top plan view of the roll feed and associated parts.
Figures 11, 12, 13:
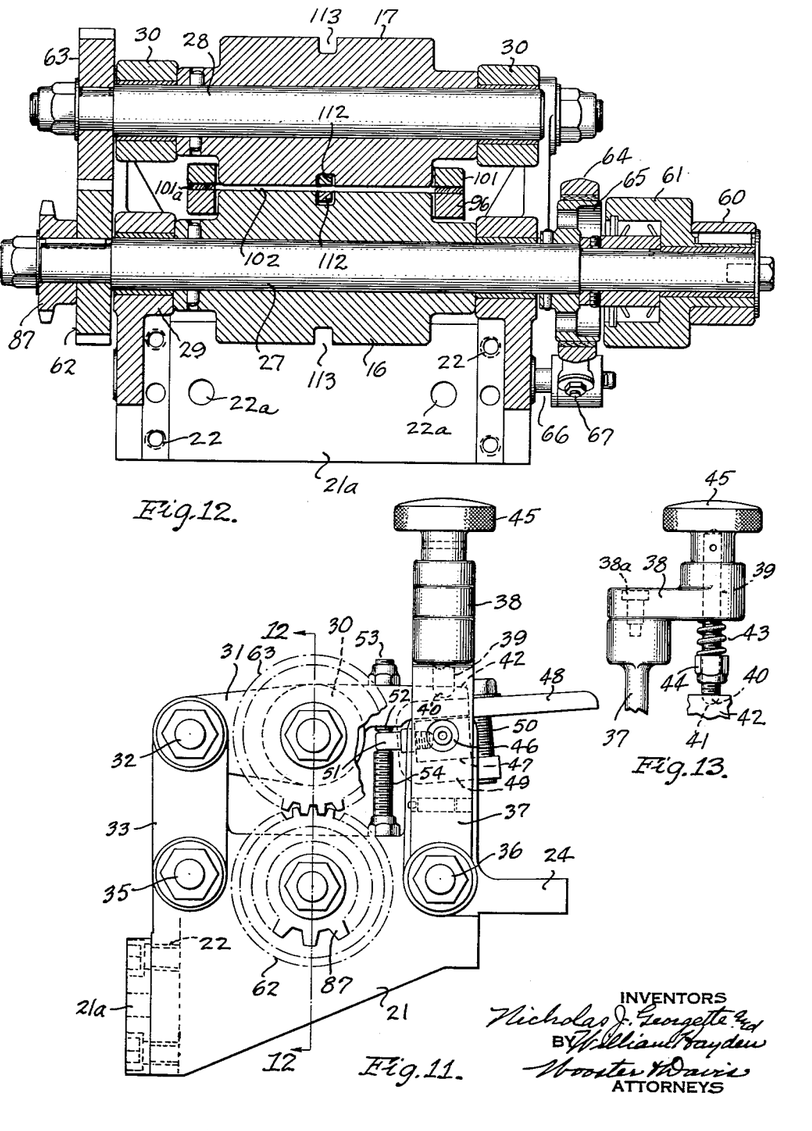
FIG. 11 is an end view thereof with parts broken away.
FIG. 12 is a vertical section substantially on line 12—12 of FIG. 11.
FIG. 13 is a detail view of a portion of the means of providing pressure on the feed rolls.
Figure 14:
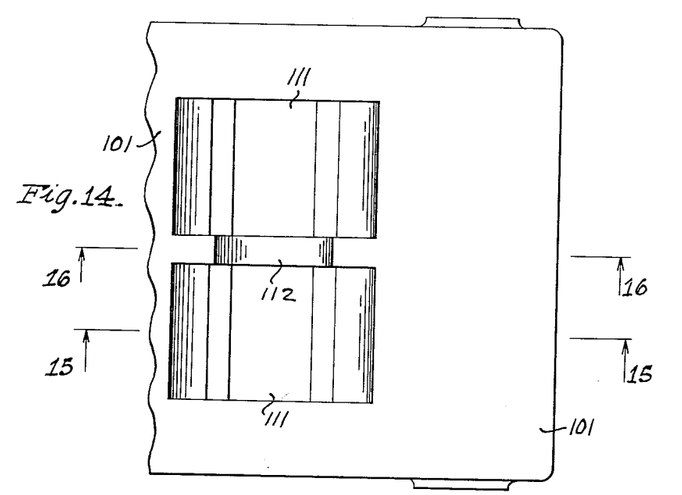
FIG. 14 is a plan view of the exit end portions of the guides for the strips to, through and beyond the feed rolls, and with the feed rolls removed.
Figure 15:
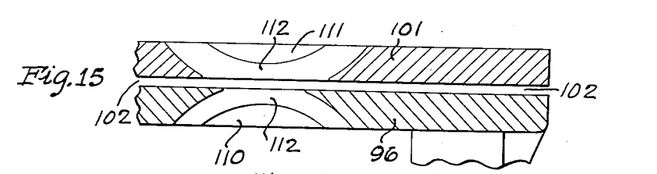
FIG. 15 is a longitudinal section on line 15—15 of FIG. 14.
Figure 16:
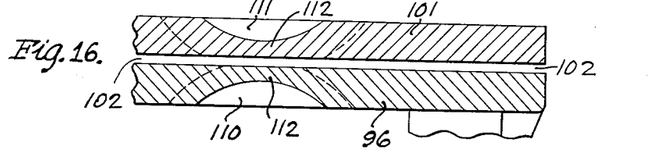
FIG. 16 is a longitudinal section on line 16—16 of FIG. 14.

Extending between these arms 37 and pivoted at its opposite ends 46 in these upright arms 37 is a lift bar 47 (FIGS. 10 and 11) which is a rectangular bar and carries a lift finger 48 which may be mounted on this bar by any suitable means, but preferably, as shown in FIG. 11, by wrapping it around the bar, as indicated at 49, and clamping it thereto by the screw 50. Mounted on this bar 47 adjacent its opposite ends are lift pins or studs 51 extending inwardly from the bar under the arms 31, and each engages the lower end 52 of an adjustable screw 53 mounted in the arm 31. At its under side the downward movement of the stud 51 is limited by the upright adjustable stop screw 54 mounted on the bracket 21. The studs 54, one under each arm 31, limit downward movement of the upper roll and thus can be set to maintain a proper spacing between the rolls, so that in the feeding of the strip by the endless belt it does not have to force the end of the strip between contacting rolls, which would be much more difficult than if the rolls are spaced only an amount slightly less than the thickness of the strip to be fed. The springs 43 provide sufficient pressure on the upper roll to provide sufficient grip between the rolls on the strip being fed to insure proper feeding of this strip to the dies in the blanking press.

Figures 1, 2:
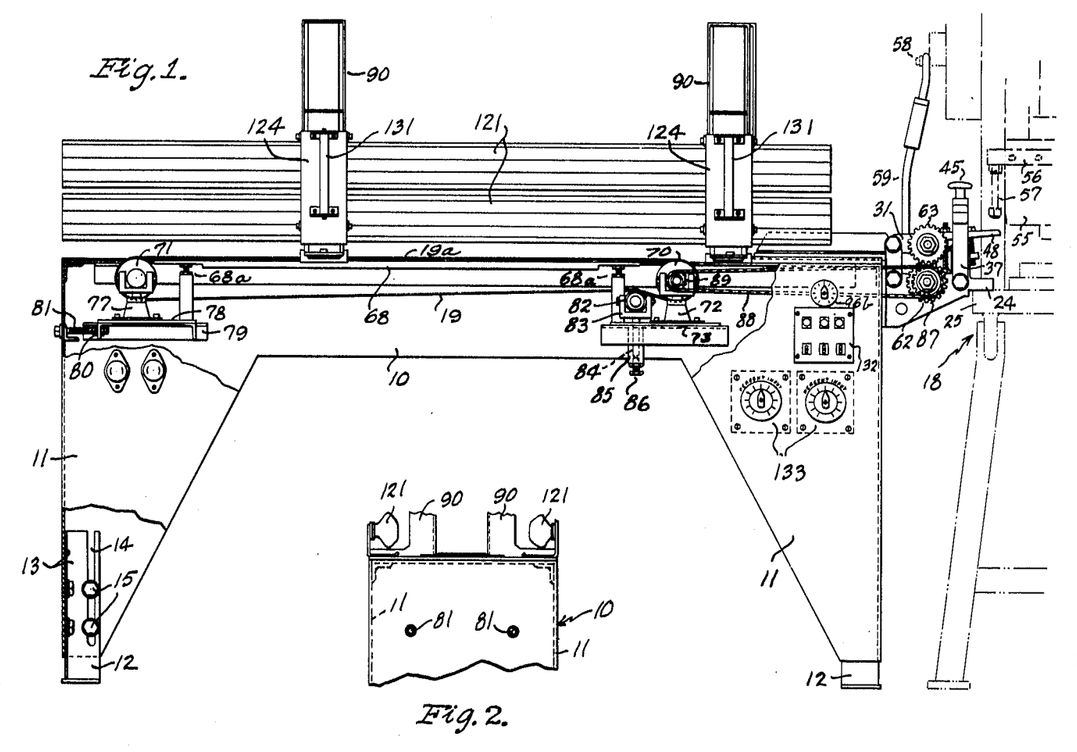
FIG. 1 is a side view of the machine with parts broken away to more clearly show the construction, and also showing its relation to a power and blanking press with which it is to be operated.
FIG. 2 is a partial end view looking from the left of FIG. 1.

Means is also provided to automatically lift the upper roll from the strip after the feeding operation and just before the dies engage the strip for the blanking operation. Thus, as shown in FIG. 1, there is provided on the vertically movable ram 55 of the press a bar 56 carrying an adjustable screw or bolt 57 to move with this ram and located over the free end of the lifting finger 48 to engage this finger on downward movement of the ram after the feeding operation of the strip and a short time before the upper die carried by this ram engages the strip being blanked, to force this finger downwardly and thus turn the bar 47 to lift the studs 51 and acting on the lower ends 52 of the screws 53 to lift the free ends of the lever arms 31 and the upper roll 17 carried thereby to relieve the grip of the rolls on the strip being fed, so that this strip is now free and the locating pilot or positioning pin in the dies can properly center and position the strip for the blanking operation.

The rolls are operated from the adjustable crank arm on the crank shaft of the press, indicated at 58, by a connection 59 to an operating lever 60 operating through a one-way clutch 61 to operate the shaft 27 of the lower roll 16, and the two rolls are connected so that the top roll is driven from the lower roll by the spur gears 62 and 63. A friction brake 64 operating on a drum 65 on the shaft 27, and carried by one of the end brackets 21 on the stud 66, prevents the rolls from moving backward on reverse movement of the clutch and the operating lever 60. The amount of friction may be adjusted by the adjusting screw 67.

Figure 3:
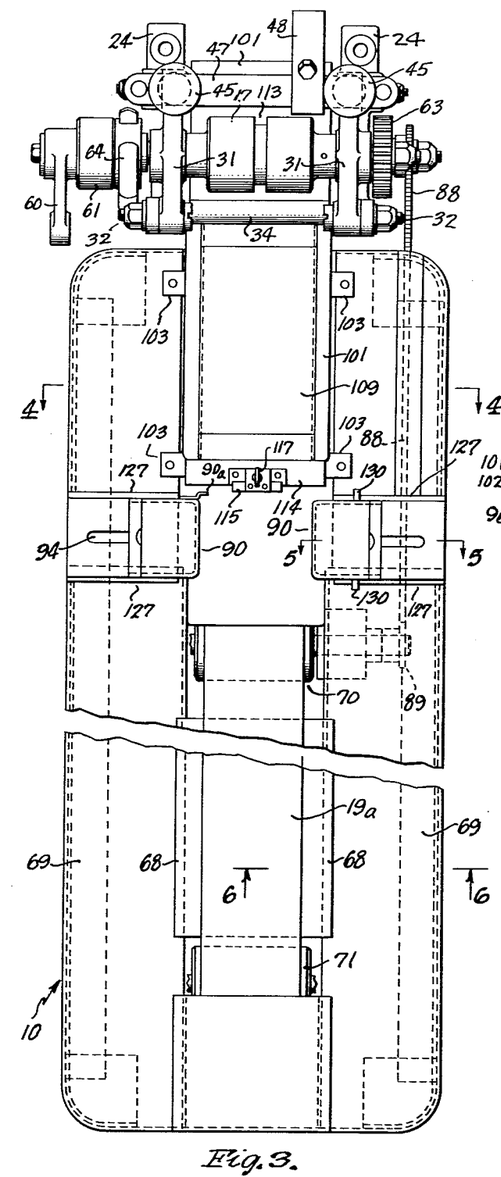
FIG. 3 is a top plan view of the machine.

The stack of strips 20 (FIGS. 5, 6 and 8) to be fed, as previously indicated, is supported on the endless belt 19. The upper run 19a of the belt is supported on a plate 68 resting at its opposite edges on longitudinally extending plates 69 forming the top of the frame or bed of the machine, and these plates 69 extend substantially the full length of the machine, as shown in FIG. 3. Plate 68 may also be supported at its opposite ends by the supports 68a. This belt is supported at its opposite ends on suitable rolls 70 and 71 mounted on suitable shafts mounted in bearings at the opposite ends of the rolls and mounted in the frame. The forward roll 70 is mounted in suitable bearing blocks 72 at the opposite ends of the roll, each supported on a plate 73 mounted on a transverse plate 74 supported at its opposite ends on angle irons 75 secured to the side walls 76. The roll 71 at the other end is mounted at its opposite ends on bearings in similar blocks 77 supported on a similar transverse plate 78 supported at its opposite ends on the angle members 79 secured to the side walls of the frame. Secured to this plate at the front edge thereof is a downwardly extending angle iron 80, and adjacent each opposite end thereof is an adjusting screw 81 operable from outside the frame whereby the plate 78 carrying the bearings for the roll may be adjusted to properly align this roll at right angles to the belt, and the roll also may be adjusted to adjust the tension of the belt.

A further means for adjusting the tension and taking up slack in the belt is provided by an idler roll 82 just to the rear of the forward roll 70 and mounted at its opposite ends in vertically adjustable blocks 83, these bearings being supported on upright rods 84 in a depending support 85 with an adjusting screw 86 at its lower end for adjusting the height of the roll 82 and to remove slack from the belt and adjust its tension. This flexible belt 19 is made of a material which would have good frictional grip on the lower strip 20a of the stack to be fed from the bottom of this stack. It is preferably of a rubber or rubber-like material, but may be of canvas or similar woven fiber material having a rubber or neoprene surface vulcanized thereto, so as to have sufficient grip on the strips to be fed without marring or injuring the surface of the material. The belt is driven for the feeding operation from the shaft 27 of the lower feed roll 16 by a sprocket 87 keyed to this shaft operating through a chain 88 to another sprocket 89 on the shaft of the forward roll 70 of the feed belt. The driving sprocket 87 is somewhat larger than the driven sprocket 89, so that the feeding speed of the belt is somewhat greater than that of the feed rolls 16 and 17, to insure that the forward end of the succeeding strip being fed by the belt is always in abutment with the following end of the previous strip being fed through the rolls to make sure there is no gap between them, which might result in a partial blank in the blanking operation of the press, but the primary object is to isure continuous positive feeding of the strip with no gaps between them, each strip beyond the feed rolls being pushed forward by the following strip.

Figure 4:
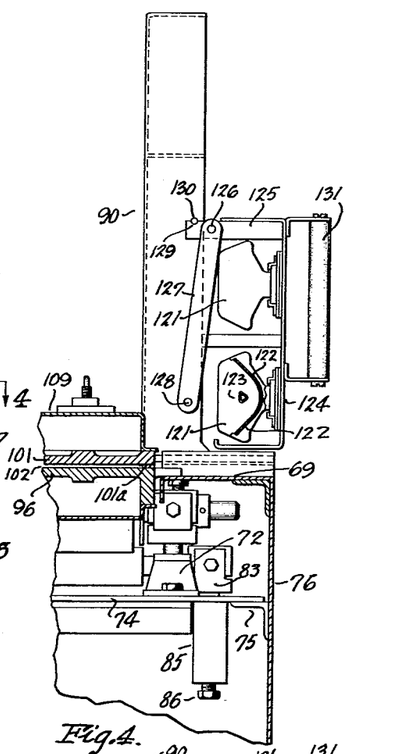
FIG. 4 is a partial transverse vertical section taken substantially on the plane of line 4—4 of FIG. 3.
Figures 5, 6:
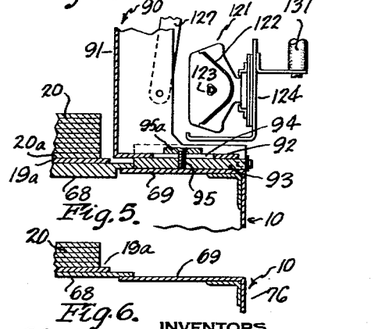
FIG. 5 is a detail section substantially on line 5—5 of FIG. 3.
FIG. 6 is a detail section substantially on line 6—6 of FIG. 3.

Upright guides and retaining members are provided on the top of the frame on opposite sides of the upper run of the belt to insure the stack 20 of the strips to be fed is properly maintained in position on the belt. There are two pairs of these upright members indicated at 90, and they are of any suitable construction, preferably substantially U-shaped in cross section to increase their strength for a given weight of material, and they are arranged with the closed sides 91, as shown in FIGS. 3 to 5, on the opposite sides of the stack. At the lower end they are provided with suitable feet 92 resting on the supporting block 93 on top of the side plates 69 and provided with a slot 94 with a securing screw 95 therethrough and a clamp bar 95a whereby these guides may be adjusted toward or from the belt according to the width of the strips to be fed.

Forwardly of the forward roll 70 of the belt and between it and the feed rolls 16 and 17 and also extending to the guiding means on the press is a guiding and supporting means for the strips being fed, comprising a plate 96 having longitudinal strengthening ribs 96a at its opposite edges and forming a recess on its under side in which may be mounted longitudinally extending electrical resistance heating units 97 secured on the under side of the plate by suitable clamping bars 98 and supporting screws 99. This plate is mounted in the frame by any suitable means, such, for example, as the lugs 103 and screws 104, and it is also secured to brackets 21 by bolts or screws (not shown) in the ears 100 and 100a.

Figures 7, 8, 9:
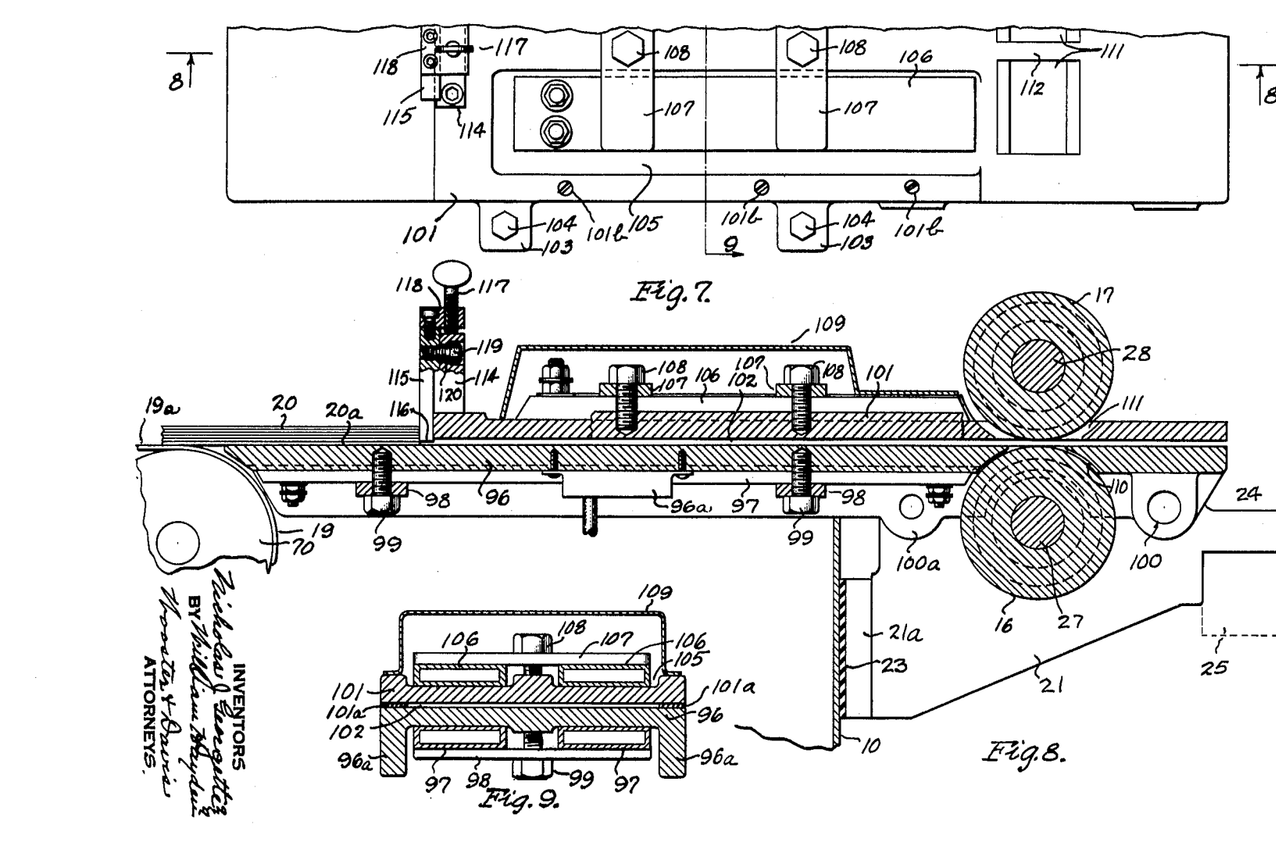
FIG. 7 is a top plan view of a portion of the heating means at the discharge end of this device.
FIG. 8 is a longitudinal section thereof substantially on line 8—8 of FIG. 7.
FIG. 9 is a transverse section substantially on the plane of line 9 of FIG. 7.

Mounted above the plate 96 is another plate 101 spaced above the plate 96 by adjustable spacing strips 101a to provide a space 102 for passage of the strips from the stack 20 on the feed belt to the feed rolls 16 and 17, and this is mounted on the top walls 69 of the frame by lugs 103 at its opposite edges resting on these walls and secured by suitable screws 104. The top wall is recessed, as indicated at 105, and in these recesses are mounted electrical resistance heating units 106 similar to those in the lower plate and secured therein by transverse bars 107 and screws 108. These units may be covered and enclosed by a sheet metal or similar covering 109. These plates 96 and 101 with their heating units thus provide a heating oven between the feed belt and the feed rolls 16 and 17, and extending through the rolls, for properly heating the strips as they are being fed to the press, and in the case of plastic or similar materials, softening them slightly so as to prevent cracking under action of the dies of the press; in other words, to heat these strips to a temperature suitable for the blanking operation. To properly guide these strips these plates 96 and 101 are carried beyond the feed rolls 16 and 17, as shown in FIG. 8, to a point adjacent the fixed guide on the press, and for this purpose the plates are provided with recesses 110 and 111 for the rolls, and to provide guiding support for the strip at the center thereof these recesses are separated by an integral bar 112, FIGS. 7 and 12, located in peripheral grooves 113 in the rolls. Thus the control guides for the strips at the under and upper sides thereof extend from the belt to the feed rolls, are carried through these rolls by the bars 112, and beyond these rolls to the fixed guide on the press. This arrangement is shown very clearly in FIGS. 7, 8, 9, 12 and 14 to 17. There is thus positive and complete control of the strips from the belt supporting the stack to the press.

To control the feed of the bottom strip from the stack on the feed belt, an escapement structure is provided at the forward end of the stack. This, as shown in FIGS. 7 and 8, comprises an upright support 114 mounted on the upper plate 101, and mounted for vertical adjustment on the forward side thereof is an upright stop plate 115 arranged with its lower edge 116 spaced above the top surface of the lower plate 96 a distance corresponding to or slightly greater than the thickness of the strips in the stack 20, to permit only the lower strip 20a to be fed forwardly by the belt while retaining the other strips in the stack. This plate 115 is mounted for vertical adjustment to accord with the different thicknesses of the strips to be fed, by means of an adjusting screw 117 engaging at its lower end on the top of the support 114 and threaded in the head 118 secured to the top of the plate 115. A locking screw 119 extends through an elongated slot 120 in the support and is threaded into the plate 115 so that after adjustment of the plate 115 it may be clamped or locked in adjusted position by the screws 119. An additional upright stop 90a (FIG. 3) may be provided as an upright metal plate on the forward guide 90 at the forward end of the stack to prevent the upper strips in the stack from moving forwardly.

Means is provided whereby the strips in the stack 20 on the belt may be preheated in the stack before being fed forwardly from the bottom of the stack by the feed belt and the feed rolls 16 and 17. Thus there may be mounted on the upright guides 90 longitudinally extending preheater elements 121. These are mounted at the opposite sides of the strips in the stack 20 and adjacent the outer edges thereof and extend longitudinally of the stack. They may be of any suitable type of structure, but a simple and effective one is shown in FIGS. 4 and 5 comprising an open trough 122 arranged with its open side facing the edges of the strips in the stack, and provided in this trough is a longitudinally extending electric heating element 123. In the arrangement shown there are two of these heaters on each side of the stack mounted on substantially U-shaped brackets 124, and at the upper ends of these brackets are bars 125 pivoted at 126 on supporting links 127 (FIG. 4) pivoted to the side walls of the guides 90 at 128. The bars 125 are each provided at their upper edges adjacent their inner ends with a notch 129 adapted to seat under pins 130 mounted on the side walls of the guides 90, and secured to the brackets 124 at their outer sides are hand grips 131. Thus by lifting on the hand grips 131 the brackets 124 may be lifted and turn the bars 125 about the pivots 126 to release the notches 129 from the pins 130 and permit the brackets 124 with the heating elements 121 to be swung downwardly and outwardly away from the guides 90 for inspection, cleaning or repair.

Figure 17:
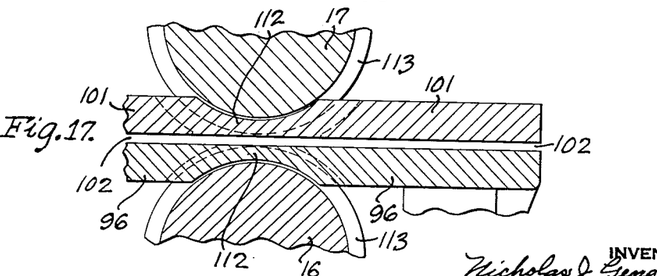
FIG. 17 is a longitudinal section on the same plane as FIG. 16, showing the feed rolls in place.

In use, this automatic strip feeder is set up adjacent to the press and attached to the floor to maintain alignment of the feed tracks with the press die, as shown in FIG. 1. The adjustable legs 12 are provided so that the height of the feeder may be set to correspond to the height of the die feed line. A special indexing feed on this machine comprising the feed rolls 16 and 17 is rigidly attached to the bolster or bed 25 of the press and flexibly attached to the frame of the machine, which also carries the belt feed for the strips, through rubber pads 23. The feeder is operated by the actuator rod 59 from the adjustable crank arm 58 on the press to operate the operating lever 60 on this machine, and therefore operate it with an indexing operation to feed the strips to the press with a step by step operation, the amount of each feeding step being controlled, of course, according to the blanking operation performed by the press, and adjustment is provided to secure the desired feed per press stroke. The work supports and guides comprising the plates 96 and 101 are extended through the bite of the rolls 16 and 17, as indicated in FIGS. 8, 12 and 17, so that one end of these guides is therefore through the heating means between these rolls and the belt feed, and the other end extends to adjacent the fixed guide on the die of the press, the fixed guide being merely an extension of the guide track in the die itself, and is not shown on the drawing, as it is merely fabricated to suit the particular press. The guide plates 96 and 101 not only guide and control movement of the strips from the belt to the press, but keep the ends of adjacent strips in abutment in cooperation with the somewhat greater surface speed of the belt over that of the feed rolls and prevent the strips from piling up on each other or becoming overlapped in the feeding operation.

As previously indicated, an electric heater is provided for bringing the strip stock to the proper blanking temperature, comprising the heater units 97 and 106 mounted in the guide plates 96 and 101, and the temperature is controlled by suitable thermostatic means (not shown) which may be mounted in a box or other supporting means 96a and controlled by any suitable means 96b on the front of the frame, and current supply controlled by suitable switches in the control plate 132 mounted on the front of the frame. Preheaters may also be provided for the strips of heavier gauge stock and for long fast feeds. These comprise the lamp units 121 located on opposite edges of the stack of strips supported on the feed belt 19. They each comprise an infrared lamp 123 extending longitudinally of the stack and mounted in the open-sided guards or trough 122. An input controller (not shown) of any standard type is used to regulate the on and off time of these heaters, together with thermostatic control, and by using one or more banks of these heaters the stock to be fed can be preheated without overheating the outer edges before the center is sufficiently hot, so that the oven comprising the heaters and plates 96, 101 can easily bring the work to the proper blanking temperature as it passes through between them. The proper switches, pilot lights, timers, thermostats and so forth, are located on the frame handy to the operator and are indicated diagrammatically at 133, FIG. 1.

In operation, the strip stock to be fed is located in a magazine as a stack or pile with the strips of the desired length one on top of the other and supported on the top run 19a of the feed belt between the upright guides or supports 90 and with their forward ends against the control plate 115. The upright supports 90 maintain this pile in position, and they also act as supports for the preheating elements 121. This feed belt 19 is indexed and synchronized with the press through the chain drive to the indexing roll feed 16, 17 operated by the press.

The bottom strip 29a slides forward with each stroke of the press, and as the end of this strip leaves the magazine stack the next adjacent strip above it comes in contact with the feed belt. The somewhat overdrive of the belt with respect to the feed rolls 16, 17 insures positive abutting of the ends of the two pieces at all times, thus reducing partial blank parts to an absolute minimum with uniform length of strip. The strip passes through the thermostatically controlled heater comprising the plates 96 and 101 and then through the indexing roll feed 16, 17 and into the die of the press for blanking. A weighted bar may be placed on the top of the strip stack 20 to maintain the necessary contact pressure with the feed belt when the magazine is almost empty. The feed belt may be molded from a high friction compound of neoprene and rubber or similar rubber-like material, to secure positive grip on the surface of the strip being fed, even on the smoothest of materials, and is nonmarking on the surface of this material although it has a slight slip on the surface due to the overfeed of the belt with respect to the feed rolls. Also, on each stroke of the press, after the feeding operation of the strip, and just before engagement of the work by the dies, the grip of these feed rolls on the strip is released by action of the screw or rod 57 carried by the ram of the press engaging the lift finger 48, as previously described.

Although this device is particularly adapted for feeding strip stock of either hot or cold laminated plastic or fiber materials, it is also adapted for feeding metal strips. The strip stock is automatically fed from the magazine into any standard blanking press, and a single loading may be sufficient for as much as up to a full day's run. The electric heating system, properly regulated by thermostatically controlled heating elements, brings the stock to the desired blanking temperature and maintains it uniformly.

Having thus set forth the nature of our invention, we claim:

1. A strip feeder for a blanking press provided with a crank arm and ram, said feeder comprising a horizontal frame, feed rolls mounted at one end of the frame, operating means for the rolls including means for connection to the crank arm of the blanking press for operation thereby, a horizontal endless belt feed, guide means above the belt to retain a stack of individual superimposed strips of material on the belt, supporting rolls for the endless belt at the opposite ends thereof mounted on the frame and supporting the belt in alignment with the feed rolls, a drive connection between the feed rolls and a belt roll to shift the belt and feed strips of material successively from the bottom of the stack to the feed rolls, upper and lower spaced guides for the strip extending from the discharge end of the belt to the feed rolls and through and beyond these rolls to a position adjacent the press between which the strip being fed is guided as it is fed from the belt to the press, said upper and lower guides being continuous from the belt to the press providing complete control on both the top and bottom of the strip and so spaced as to keep successive strips in the same plane, yieldable spring means for pressing one roll against the strip between the rolls to grip the strip for the feeding operation, and means for shifting the said roll against action of the spring means to release the grip on the strip operable by means on the ram of the blanking press with which the feeder is being used to shift said roll in timed relation with operation of the press.

2. A strip feeding machine for a blanking press having a crank shaft and a ram, said feeding machine comprising an endless horizontal belt adapted to support a stack of flat strips of the material to be fed arranged one on the other, a roll feed adjacent one end of the belt and in alignment therewith to receive the strips in succession therefrom, said roll feed comprising a pair of rolls arranged one above the other, means mounting the upper roll for movement to and from the lower roll, spring means biasing the upper roll toward the lower roll to grip the strip being fed between them, means for driving the rolls from the crank shaft of the press in timed relation with the operation of the press, a driving connection from the rolls to the belt to feed the strips successively from the bottom of the stack to the rolls, upper and lower guides for the top and bottom of the strip extending from the belt to the rolls and from the rolls to the press, said upper and lower guides being continuous from the belt to the press providing complete control on both the top and bottom of the strip and so spaced as to keep successive strips in the same plane, and means operable from the ram of the press to lift the upper roll after the feeding operation and before the blanking operation to release the grip of the feed rolls on the strip.

3. A strip feeding machine for a blanking press including a bolster or bed and a crank shaft, said feeding machine comprising a frame, an endless horizontal belt mounted on the frame adapted to support a stack of flat strips one above the other to be fed to the press, a roll feed comprising a pair of rolls, bracket means mounting the rolls, means securing the bracket means to the frame with the rolls adjacent one end of the belt and in alignment therewith to receive the strips therefrom, yieldable flexible pads between the bracket means and the frame, means for rigidly securing the bracket means to the bolster or bed of the press, means for operating the feed rolls from the crank shaft of the press, an operative connection from the feed rolls to the belt to feed the strips successively from the stack to the feed rolls, and top and bottom guides for the strip extending from the belt to the rolls and from the rolls to the press.

4. A strip feeder for feeding a strip to a blanking press, said feeder comprising a horizontal frame, feed rolls mounted at one end of the frame, operating means for the rolls, an endless horizontal belt feed, supporting rolls for the endless belt at the opposite ends thereof mounted on the frame and supporting the belt in alignment with the feed rolls, a drive connection between the feed rolls and a belt roll, a pair of upright laterally spaced guides adjacent opposite ends of the belt adapted for retaining a stack of superimposed strips of material on the belt and guiding individual strips fed in succession from the stack by the belt to the feed rolls, said belt being covered with a high friction compound to grip the bottom strip of the stack and feed it forwardly to the feed rolls, and top and bottom guide means for the strip extending from the discharge end of the belt to the feed rolls and through and beyond these rolls to adjacent a blanking press between which the strip being fed passes as it is fed from the belt to the press, the drive from the feed rolls to the belt having a ratio which drives the belt at a somewhat higher surface speed than that of the rolls to maintain the forward end of a strip being fed forwardly by the belt always in abutment with the rear end of the previous strip in the feed rolls.

5. A strip feeding machine for a blanking press comprising an endless horizontal belt adapted to support a stack of flat strips of the material to be fed arranged one on the other, a roll feed adjacent one end of the belt and in alignment therewith to receive the strips in succession therefrom, means for driving the roll feed in timed relation with operation of the press to feed the strips successively to the die of the press, upper and lower spaced guides for the strip extending from the discharge end of the belt to the feed rolls and through and beyond these rolls to a position adjacent the die of the press between which the strip being fed is guided as it is fed from the belt to the die, said upper and lower guides being continuous from the belt to the press providing complete control on both the top and bottom of the strip and so spaced as to keep successive strips in the same plane, and means for driving the belt from the feed rolls to feed the strips successively from the bottom of the stack to the feed rolls, the drive from the feed rolls to the belt having a ratio which drives the belt at a surface speed somewhat higher than that of the feed rolls to insure there is no gap between successive strips and they are kept in abutting relation as they are fed to the press.

6. A strip feeding machine for a blanking press comprising an endless horizontal belt adapted to support a stack of flat strips of the material to be fed arranged one on the other, a roll feed adjacent one end of the belt and in alignment therewith to receive the strips in succession therefrom, means for driving the roll feed in timed relation with operation of the press to feed the strips successively to the die of the press, upper and lower spaced guides for the strip extending from the discharge end of the belt to the feed rolls and through and beyond these rolls to a position adjacent the die of the press between which the strip being fed is guided as it is fed from the belt to the die, and means for driving the belt from the feed rolls to feed the strips successively from the bottom of the stack to the feed rolls, the drive from the feed rolls to the belt having a ratio which drives the belt at a surface speed somewhat higher than that of the feed rolls to insure there is no gap between successive strips and they are kept in abutting relation as they are fed to the press.

References Cited in the file of this patent

UNITED STATES PATENTS

| | | |
|---|---|---|
| 382,441 | Selby | May 8, 1888 |
| 747,395 | Fales | Dec. 22, 1903 |
| 854,706 | Eden | May 21, 1907 |
| 1,377,810 | De Escobales | May 10, 1921 |
| 1,421,354 | Littell | June 27, 1922 |
| 1,426,980 | Gitzendonner et al. | Aug. 22, 1922 |
| 1,588,843 | La Bombarde | June 15, 1926 |
| 2,110,980 | Swift | Mar. 15, 1938 |
| 2,192,265 | Kallander | Mar. 5, 1940 |
| 2,203,937 | Barley | June 11, 1940 |
| 2,254,097 | Wood | Aug. 26, 1941 |
| 2,361,687 | Hermani | Oct. 31, 1944 |
| 2,389,551 | Ryan | Nov. 20, 1945 |
| 2,485,952 | Apgar et al. | Oct. 25, 1949 |
| 2,522,956 | Middleton | Sept. 19, 1950 |
| 2,581,599 | Parker | Jan. 8, 1952 |
| 2,689,522 | Curtis | Sept. 21, 1954 |
| 2,895,416 | Mazzio et al. | July 21, 1959 |

FOREIGN PATENTS

| | | |
|---|---|---|
| 675,911 | Great Britain | July 16, 1952 |